United States Patent [19]

Parker

[11] 4,038,632
[45] July 26, 1977

[54] OIL AND GAS WELL DISASTER VALVE CONTROL SYSTEM

[75] Inventor: William H. Parker, Hurst, Tex.

[73] Assignee: Del Norte Technology, Inc., Euless, Tex.

[21] Appl. No.: 629,515

[22] Filed: Nov. 6, 1975

Related U.S. Application Data

[63] Continuation-in-part of Ser. No. 294,289, Oct. 2, 1972, Pat. No. 3,961,308.

[51] Int. Cl.² .................................... E21B 35/00
[52] U.S. Cl. ................... 340/18 NC; 340/18 P; 175/40; 166/72; 340/15.5 TN
[58] Field of Search .............. 166/72; 340/15.5 CC, 340/15.5 TC, 15.5 TI, 18 NC, 18 P; 181/103, 105, 139; 175/40, 48; 33/307

[56] References Cited

U.S. PATENT DOCUMENTS

| | | | |
|---|---|---|---|
| 2,810,546 | 10/1957 | Eaton et al. | 340/18 NC |
| 3,739,845 | 6/1973 | Berry et al. | 166/72 |
| 3,790,930 | 2/1974 | Lamel et al. | 340/18 NC |
| 3,850,237 | 11/1974 | Ahlstone et al. | 166/72 |

OTHER PUBLICATIONS

Haase, "Acoustic Value Operating System", 1970, pp. 269-277, Offshore Tech. Conf. G-222.
Cooper, "Correlation Detection in a ... Seismic Disturbances", 7/64, pp. 1378-1382, Jour. Acous. Soc. of Amer., vol. 36 No. 7, G-222.

*Primary Examiner*—Nelson Moskowitz

[57] ABSTRACT

A sonic energy signal is transmitted continuously through the walls of tubing extending down into an oil or gas well, in order to control a disaster valve at the lower end of the tubing. If the signal disappears, the valve shuts automatically. In one embodiment, the tubing functions as the core of a transformer. In another embodiment, the tubing conducts an acoustic signal. The sonic energy may be transmitted by either a hydraulic ram or a tuned hammer, which transmits energy vertically into the tubing walls.

11 Claims, 8 Drawing Figures

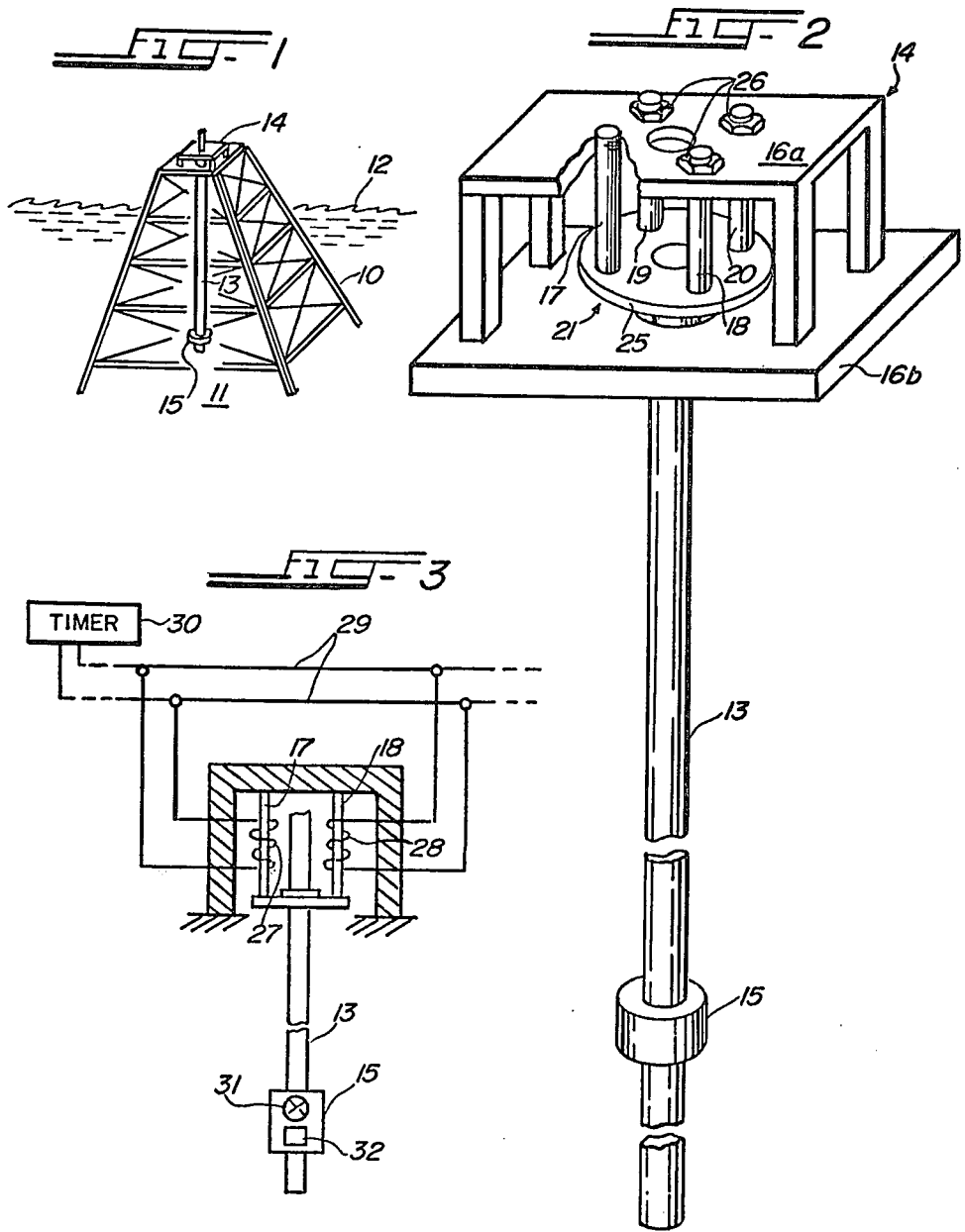

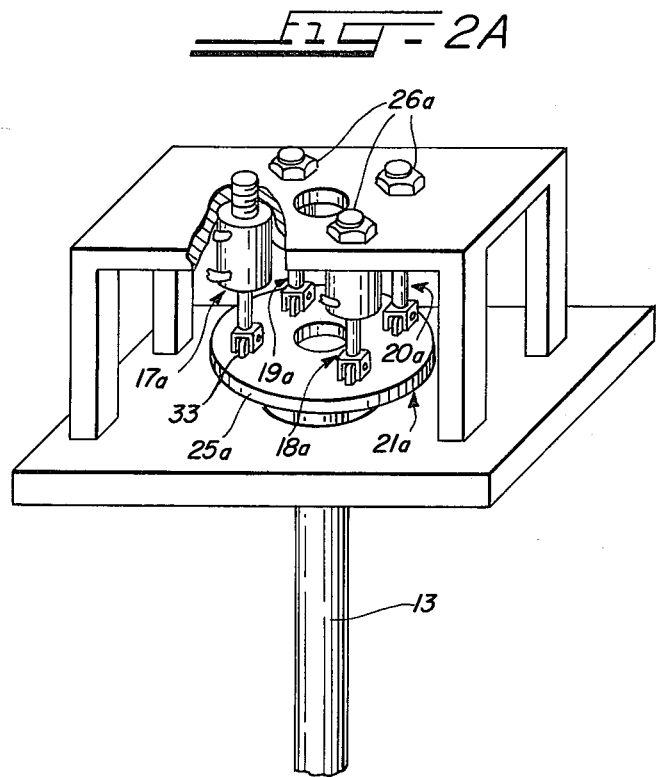
FIG-2A
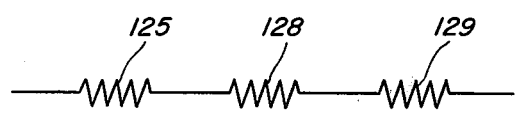
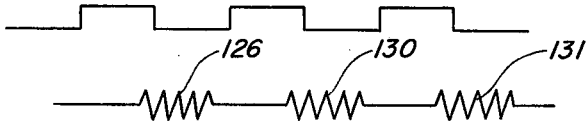
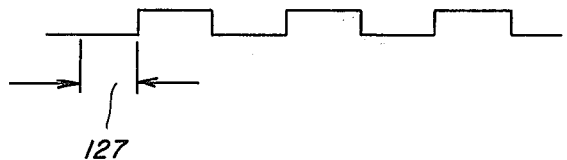
FIG-7
A  VERTICAL SIGNAL
B  VERTICAL GATE  142
C  HORIZONTAL SIGNAL
D  HORIZONTAL GATE  144

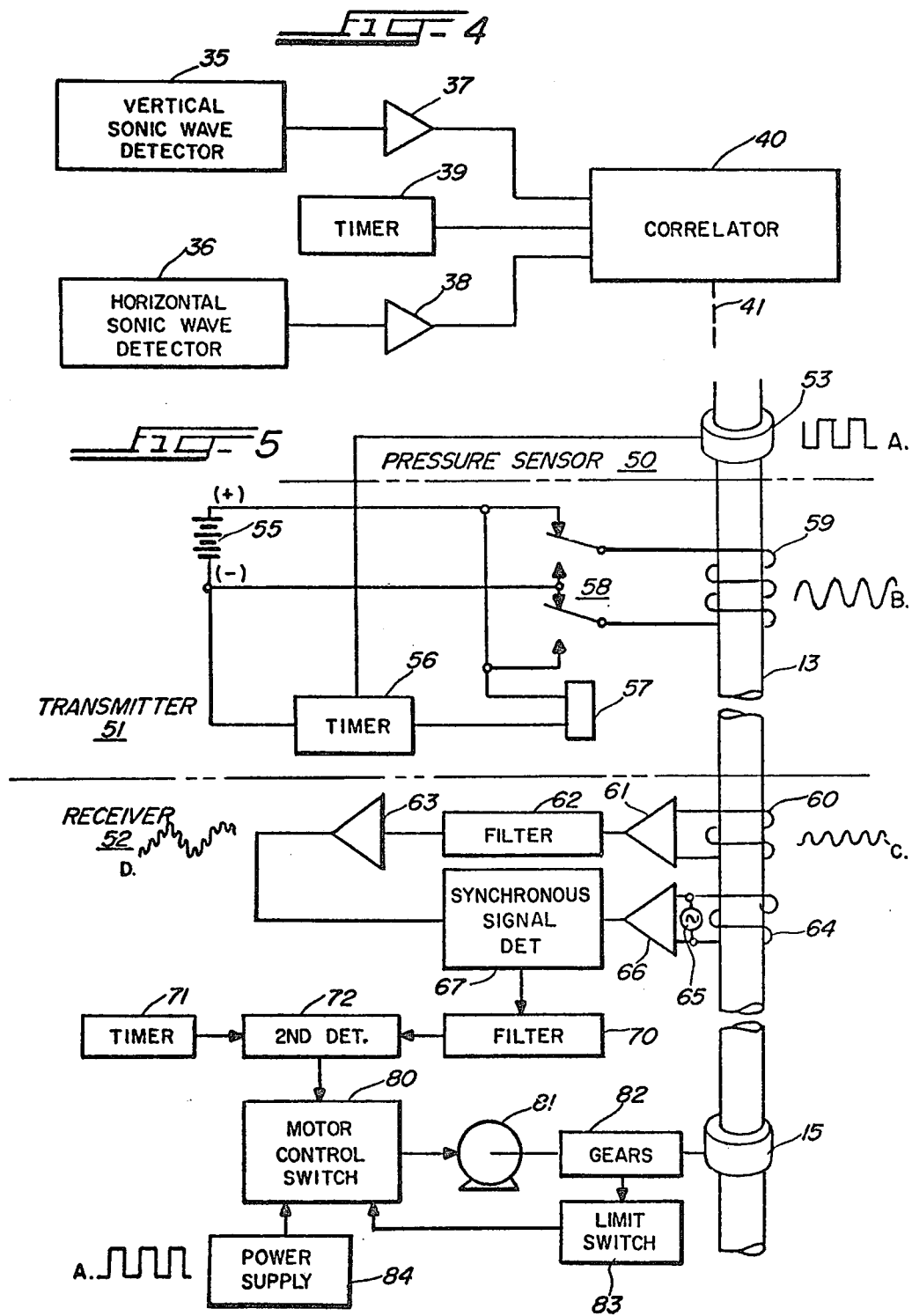

OIL AND GAS WELL DISASTER VALVE CONTROL SYSTEM

This is a continuation-in-part of application Ser. No. 294,289, filed Oct. 2, 1972 now U.S. Pat. No. 3,961,308.

This invention relates to the control of valves and other devices especially — although not exclusively — associated with an oil or gas well pipe line or tubing, and more particularly to systems for controlling valves at the bottom of the tubing, which must be shut in times of disaster.

The problem of oil or gas well flow control has recently been a subject matter of great public concern. One reason for this concern is the widely publicized spills wherein underwater oil wells leak into the ocean. The crude oil flows to the ocean surface, kills wildlife, ruins beaches, and provokes public outcry. One solution to these oil spill problems is to place a disaster valve over the mouth of the well. If there is a disaster or runaway condition, the valve closes, and no oil or gas can thereafter leave the well.

The usual approach is to extend a communication line or duct down the pipe to control the valve. The line or duct might be hydraulic, pneumatic, or electric. One trouble is that the oil spill might be caused by a natural disaster such as storm, fire, or the like. If so, the communication line is very likely to be broken or otherwise rendered inoperative responsive to the same disaster that breaks the pipe, leading to the spill. To overcome these problems, some have placed the communication line inside the pipe or tube. However, the installation and removal of this line is troublesome, hinders cleanout, and it may become entangled in a manner which actually prohibits the valve control.

Accordingly, there is a need for a fail-safe system and method of controlling disaster valves at the bottom of an oil or gas well. The system should function equally well without regard as to whether the valve is remotely located, far down inside a borehole, or deep under the sea.

Therefore, an object of the invention is to provide a new and improved system for controlling valves and other devices at the bottom of an oil pipe line. Here an object is to provide a fail-safe method of controlling the valves or other devices even if the pipe line is completely broken and all communication is lost between the valve and the top of the well.

Yet another object of the invention is to eliminate the need for all separate communication lines or ducts. Here an object is to use the device actually being monitored (i.e., the pipe line or tubing) as the communication channel so that communications are as reliable as the monitored device.

Another object of the invention is to improve maintenance and reduce costs by eliminating ducts inside the tubing. In this connection, an object is to eliminate the cost of extending extra communication lines for transmitting control signals.

In keeping with an aspect of this invention, the walls of the tubing are used as a communication line. A pressure sensing device at the top of a well detects any abnormal change of pressure. Responsive thereto, a signal in the tubing is used to shut down the flow of gas or oil by closing a valve. Preferably, either a hydraulic ram stretches and relaxes the tubing or a tuned hammer pounds on the top of the tubing, to transmit vibrations at a fixed frequency through the tubing wall. Depending upon the characteristics of the tubing material, the resulting vibrations resolve themselves into vertical and horizontal components having predictable timed relationships. Therefore, the vibrations travelling through the tubing walls may be separated from random noise by a discrimination system based upon this timed relationship. Responsive to a detection of vibrations sent in the above described manner, the valve may be held in an opened position against a spring bias. This way, a broken tube results in a disaster signal for automatically closing the valve.

The nature of these embodiments may become more apparent from a study of the attached drawings wherein:

FIG. 1 schematically shows an exemplary off-shore oil well tower with tubing extending down to a disaster valve at the ocean floor;

FIG. 2 is a schematic view in perspective, of the pertinent parts of the tower of FIG. 1, showing an embodiment employing magnetostrictive rods for generating an acoustic signal;

FIG. 2A shows a system similar to that shown in FIG. 2, modified to use hydraulic rams for transmitting sonic energy;

FIG. 3 is a schematic showing of the electrical transducer element used in FIG. 2;

FIG. 4 is a block diagram of a detector circuit at the bottom of the well which is used to detect the acoustic signal transmitted through the tubing wall;

FIG. 5 is a combined showing of an oil well pipe or tubing and a block diagram of a second embodiment using an electrical system for controlling a disaster valve at the bottom of the well;

FIG. 7 is a series of wave forms which are useful for explaining the operation of the circuit of FIG. 6.

Figure 6:
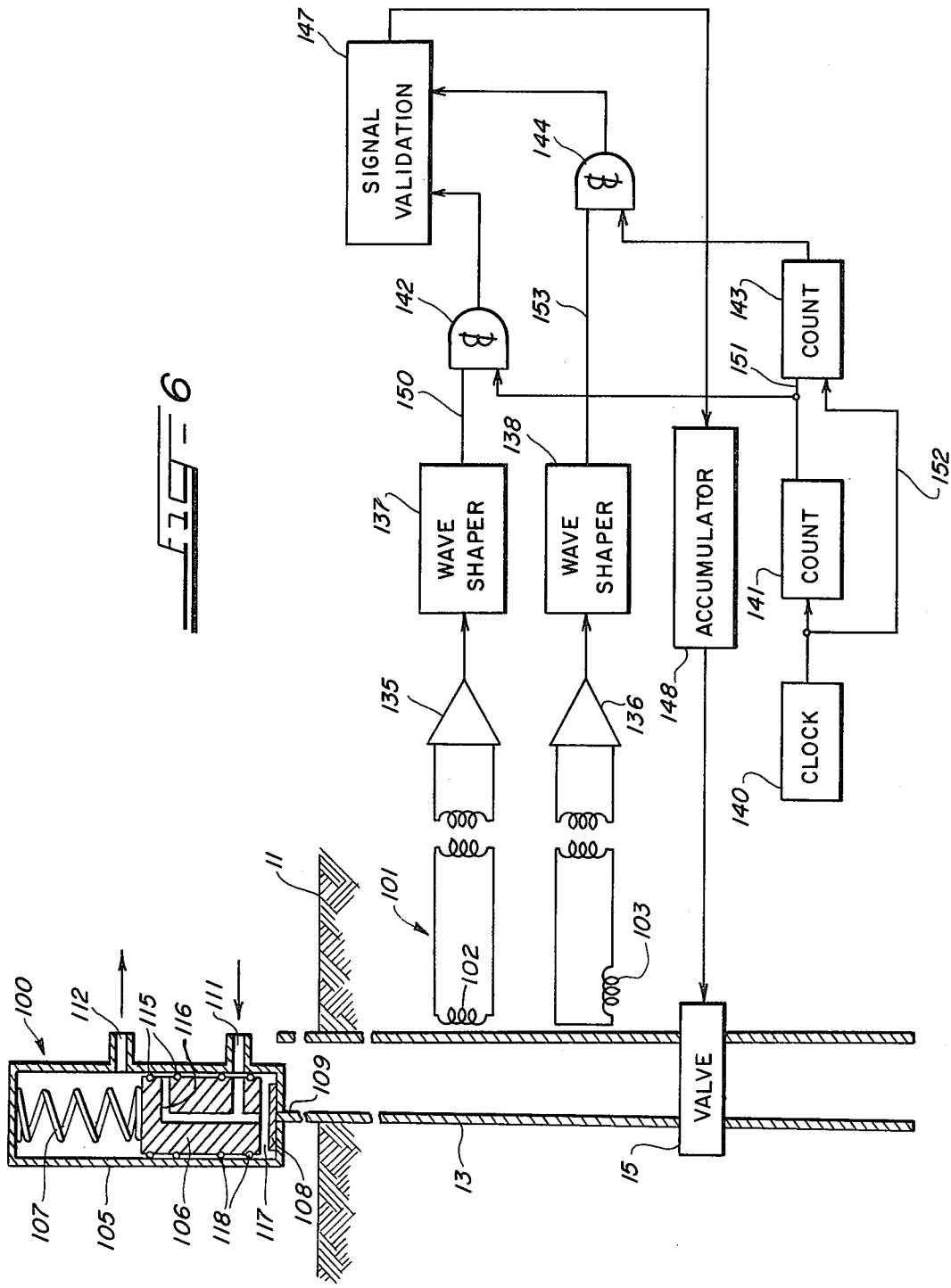
FIG. 6 is a schematic and block diagram of a third embodiment of the invention using a tuned hammer for transmitting acoustic energy through the tubing wall.

By way of example, FIG. 1 shows an oil or gas well tower 10 resting on the ocean floor 11 with the top 14 projecting above the surface 12 of the ocean. A pipe or tubing 13 extends vertically from the tower top 14, through the tower structure 10 to the ocean floor 11. Control equipment on the top 14 of the tower controls the pumping and flow of the oil or gas through the tubing 13. On the bottom end of the tubing 13, a disaster valve 15 is adapted to close in order to shut down the flow of oil or gas.

This showing of an off-shore tower 10 is symbolically exemplary of almost any well drilling and pumping equipment. Therefore, references hereinafter to towers, off-shore rigs etc. are to be construed broadly enough to cover any and all suitable oil or gas conveying equipment. Some of the pipes and tubing may be many thousand feet long. Others may be longer or shorter.

The problem exemplified by this oil tower 10 is one of controlling disaster valve 15 responsive to control equipment located at the top 14 of the tower.

In FIG. 2, the tubing 13 may be a string of pipe sections extending downwardly from control equipment at tower top 14, perhaps many thousands of feet, to a disaster valve 15. The control equipment includes a table-like structure 16a resting on a platform 16b supported by the tower structure. A group of magnetostrictive rods 17–20 are suspended from the top of the table. While four rods 17–20 are here shown, any suitable number of rods may be provided, such as four, six, eight, 10 or more rods. Each rod may be made of nickel, perhaps an inch or so in diameter and in the order of 4 feet long.

In a variation of this embodiment, the magnetostrictive rods of FIG. 2 are replaced by any other suitable means for raising the then dropping the tubing string. For example, FIG. 2A shows that hydraulic rams 17a--20a may be used in place of the magnetostrictive rods 17-20.

The weight of tubing 13 hangs from these rods, rams, or the like, thereby tending to stretch or tension them. Since the lower end of the tubing 13 extends down into the earth and the upper end is hanging upon rods 17-20, rams 17a-20a, or the like, in an unrestrained manner, the intermediate tubing is free to move or stretch at least a few thousandths of an inch.

A transmitting transducer 21 is adapted to send sonic energy signals down the tubing 13. In greater detail, the top of the tubing 13 terminates in a flange 25 which is supported by the magnetostrictive rods 17-20, hydraulic rams 17a-20a, or the like. While any suitable attachment means may be used, the rods and rams are here shown as being threaded at their top ends. Large nuts 26 are turned onto the threaded ends. The bottoms of the rods or rams are attached to flange 25 in any suitable manner, such as by shackles 33, for example.

A coil such as 27, 28 surrounds each of the magnetostrictive rods. Simultaneously, each coil is selectively energized or deenergized responsive to current in a common circuit 29. The coils are electrically insulated wire wrapped — in the magnetic sense — in a series aiding manner. For the rams, a suitable common hydraulic conduit or control device is provided.

A timer 30 energizes the common circuit wires 29 or pressurizes equivalent hydraulic lines, at accurately timed intervals. The resulting electrical currents create magnetic fields in the magnetostrictive rods 17-20 which cause them to contract or shrink, or hydraulic pressure retracts the rams, and lifts or stretches the tube. When the timer 30 removes the electrical signal from the wires 29, or the pressure from the hydraulic line, the magnetic field collapses in the magnetostrictive rods, or the rams extend. Responsive thereto, the rods or rams lengthen and the tubing 13 is released. This stretching and relaxing of the tubing 13 transmits pings or pulses of acoustic energy down the pipe walls.

It should be obvious that means, other than the magnetostrictive rods or hydraulic rams, may be used to transmit the sonic energy.

The pulses of sonic energy travel down the tube walls at a fixed velocity and with a known transmission characteristic, which depends upon the material used to make the tubing. The principal energy travels in a compression or p-wave mode. As the energy travels, transverse vibration occurs to cause a second sonic energy wave front traveling in the tubing at a slower velocity. Therefore, each sonic energy pulse transmitted responsive to the output of timer 30 arrives at the bottom of the tubing in the form of two sonic energy pulses (herein called vertical and horizontal energy) displaced from each other in time by a predetermined period of time. Random noise may be distinguished since it will not occur with the same predictable timing differential.

Means are provided at the bottom of the tubing for detecting the sonic energy pulses transmitted from the top of the tubing. In greater detail, the disaster valve 15 comprises a mechanical valve 31 for shutting down the flow of oil or gas from the well and an electronic control package 32 for selectively opening and closing the valve.

The electronic package 32 is constructed, as shown by the block diagram in FIG. 4. More specifically, a first receiving transducer 35 detects the principal vertical compression or p-wave or sonic energy traveling down the tubing as a direct result of the ping of acoustic energy developed when the tube is stretched and relaxed. A second receiving transducer 36 detects the secondary horizontal or transverse wave of sonic energy traveling down the tube. The outputs of these two detectors are amplified at 37, 38.

A local timer operates at a pulse repetition rate which is a function of the pulse repetition rate of the timer 30, thereby providing an axis of reference. Preferably, the timer 39 locks into self-synchronism responsive to the timing of uniformly spaced pulses received down the tubing. A correlator 40 compares the outputs of the timer 39 and of the two receiving transducers 35, 36.

Noise in the tubing wall will not have any fixed relationship to the system timing. Thus, noise does not coincide with enable periods established by the timer 39, to repeatedly enable the system to receive energy at the intervals fixed by the timer 30. The natural resonance of the described system may be put at about 2,000 Hz, which does not match any other source of acoustic energy in an oil or gas field. Therefore, timer 39 will not lock into synchronism with random noise or with vibrations caused by pumps, drills, or the like. It is extremely unlikely that random noise could cause the correlator 40 to receive successive vertical and horizontal signals which compare with the system signals since the signals must emanate from a point which is the exact distance away from the gate so that the signal will reach the gate at the correct time and with the standard time intervals. Hence, noise is rejected. To further promote noise isolation, the correlator has an electronic gate which closes between timer pulses to preclude response to any signals received between standard time intervals.

As long as sonic energy pulses continue to travel down the tubing at fixed intervals, the correlator output at 41 holds the valve 31 open. If the transmitting transducer (rods 17-20, coils 27, 28, and wires 29 or hydraulic rams 17a-20a, and their controls) ceases to transmit sonic energy to the disaster valve 15, it shuts automatically, often under a spring bias.

Therefore, even if the tubing should break into tiny pieces, the valve 31 will shut. Moreover, if desired, the valve may be a spring loaded device which snaps shut when a power source is removed. Therefore, it is a fail-safe device. To further insure against faulty valve response, the circuit may be adjusted to require an accumulation of, perhaps, 10 (for example) successive pulses before enabling the valve to open, but a loss of only two (for example) successive pulses to close the valve.

A similar system is shown in FIG. 5 except that the energy pulses are sent down the tubing 13 in the form of magnetic flux changes. The major elements of this electrical system are a pressure sensor system 50, a transmitter 51, and a receiver 52. The sensor 50 includes any suitable device 53 which responds to abnormal pressure changes — either too low or too high, as desired. In its simplest form, this sensor could be an oil pressure gauge which gives signals when the "needle" moves out of a predetermined zone. Other and preferred devices are known to those who are skilled in the art.

The transmitter 51 comprises a source 55 of D.C. power, a timer 56, a relay 57, polarity reversing contacts 58, and a primary winding 59 on the tubing 13. The timer 56 may operate at about 3 Hz, for example. The primary winding 59 may have in the order of 400 to 1,000 turns.

As long as the sensor 53 detects normal oil or gas pressure in tubing 13, the timer 56 operates to send periodic control signals to relay 57. When relay 57 is released, the top of primary winding 59 is positive (+) and the bottom is negative (−). When relay 57 is operated, these polarities are reversed so that the top of the primary winding 59 is negative (−) and the bottom is positive (+). Thus, a square wave signal A appears in primary winding 59.

The walls of tubing 13 function as the core of a transformer functions. Therefore, a reversing D.C. signal A in primary winding 59 causes an A.C. signal B to be induced in secondary windings by the core flux changes.

The receiver 52 comprises a secondary transformer winding 60 which acts as a detector coil for the flux changes. This winding may have approximately 10,000 turns. The winding is connected to drive, in cascade, amplifier 61, a filter 62, and a second amplifier 63.

Another secondary winding 64 on the tubing core 13 is driven by an oscillator 65 at a predetermined frequency (signal C), such as 200 Hz. This same 200 Hz signal is also applied through an amplifier 66 to a synchronizing signal detector 67. In the tubing core 13, the 3 Hz flux changes sent down the well tubing 13 mix and combine with the 200 Hz flux changes generated locally to produce signal D. The 3 Hz changes may be transmitted over greater distances. The 200 Hz changes are easier to amplify and process electronically. They avoid reciprocal frequency problems (1/F) inherent in low frequency amplifiers. Therefore, the signal D passing through filter 62 is a combination of wave forms B and C, having a frequency in the order of 195 Hz to 205 Hz. This signal is applied to the other side of the synchronism signal detector 67.

The locally generated 200 Hz signal is cancelled in the detector 67 so that only the 3 Hz signal is transmitted to the filter 70. A locally operated timer 71 has a sunchronized output which is a function of the output of the timer 56. Therefore, detector 72 gives an output signal when the signals of timer 71 and filter 70 coincide. The detector 72 may have any suitable form such as a narrow band locked-loop detector, which discriminates against unwanted frequencies.

A third and preferred embodiment of the invention is shown in FIGS. 6 and 7. Here, a tuned hammer 100 is mounted on the top of the tubing string 13 to vertically pound the tubing, and thereby transmit sonic energy through the tubing wall to the detectors 101 near the bottom of the tubing. These detectors may be any suitable vibration detectors, such as those conventionally known as geophones, for example. One geophone 102 detects the vertical component. The other geophone 103 detects the horizontal component.

The tuned hammer 100 comprises a closed housing 105 having a hammer 106 of known weight mounted therein for free and virtually unrestrained vertical motion. A spring 107 is positioned above the hammer to tune the system to have a known period determined by the weight of the hammer and the spring constant. The spring normally urges the hammer downwardly to the lowermost position where the bottom face 108 of hammer 106 rests on the top 109 of the tubing. Of course, the disclosure is schematic only, since the hammer pounding directly on the top of the tubing would tend to mushroom it. Therefore, the hammer will act upon suitable mechanical means for efficiently transmitting sonic energy through the tubing wall without damaging it.

The housing 105 has a inlet port 111 and an outlet port 112 for transmission of a fluid under pressure, such as a pneumatic or hydraulic fluid, or the like. More particularly, a gas is forced into the inlet port 111 under pressure. Two O-rings 115 seal the cylindrical periphery of the hammer 106 to the internal cylinder walls of housing 100, so that the gas cannot escape through an opening 116 inside and through the wall of the hammer 106. The gas does escape from hammer 106 and through an air passage 117 to expand under two O-rings 118, thereby lifting the hammer 106 against the force of spring 107.

As the pressurized air forces the hammer 106 upwardly, the orifice 116 comes into registry with the outlet port 112. The air pressure under the hammer is relieved. Therefore, the spring 107 forces the hammer downwardly, causing it to strike against the top of the tubing 13. Then, the stroke repeats.

The weight of the hammer 106, the constant of the spring 107, and the pressure of the air, all cooperate to tune the hammer so that its strokes recur at a regular and accurately predicted frequency.

The sonic energy thus generated in the tubing wall travels down the wall and resolves itself into vertical and horizontal components, as shown in FIG. 7A, 7B. More particularly, the vibrating line (as at 125) represents the vertical mode of a sonic energy pulse induced by one hammer stroke. The vibrating line 126 represents the horizontal mode of the same sonic energy pulse, induced by the same hammer stroke. The time difference 127 between these two modes is attributed to the sound energy transmission characteristics of the material which makes up the tubing wall. Therefore, the detector circuit may discriminate between random noise and hammer strokes by detecting vertical mode signals 125, 128, 129 which recur at the intervals of the tuned hammer strokes, with horizontal mode signals 126, 130, 131 lagging behind each vertical signal by the known and predictable time period 127. (Note that the system responds to the proper intervals between signals, as distinguished from a filter type device which responds to frequency.)

Briefly, the invention provides vertical and horizontal geophone type vibration sensors 102, 103, respectively. These sensors are connected to the inputs of amplifiers 135, 136, respectively, which raise the signal level to a standard input amplitude. The outputs of these amplifiers are connected to individually associated wave shapers 137, 138 which provide an output signal of a form that can trigger the AND gates 142, 144, if they are then enabled.

A free running clock 140 generates cyclically recurring pulses, with extreme accuracy. These clock pulses are counted by a counter 141 to measure the recurring, standard time interval between the signals 125, 128, 129 generated by the tuned hammer. After the count is completed by counter 141, the AND gate 142 is briefly enabled at its lower input, and thereafter the count is repeated. If a hammer signal is then present at the end of each count, the AND gate 142 is also enabled over wire 150, and it conducts. A second counter 143 is also triggered when the AND gate 142 is enabled. This counter 143 then counts clock pulses received over wire 152 and measures the time interval 127. At the end of that measured time period, AND gate 144 is enabled at its lower input, and if a horizontal component is present that AND gate 144 conducts. The conducting periods of AND gates 142, 144 are shown by curves 7B, C, respectively.

In greater detail, the major parts of the detector circuit are preferably a quartz crystal controlled clock pulse oscillator 140, a series of counters 141, 143, a decoding or count conversion and signal validation circuit 147, an accumulator circuit 148, and output circuit for controlling the valve at 15. The oscillator 140 may have a cyclic output waveform of any suitable wave shape, such as a sinusoidal wave or a series of pulses, for example. In either event, the waves or pulses form a series of positive or negative signals which may be counted at 141, 142, in either a decimal or binary form.

For example, assuming that the clock pulse oscillator 140 is operating at one megahertz, the counterstages 141, 143 provide counts in microseconds. The maximum width of these microsecond pulse intervals becomes the error factor which limits the accuracy. If less accuracy is required the count may be slowed, or for greater accuracy the count may be speeded. Any number of counterstages may be provided, as desired.

Assume, for example, that the interval between the output pulses from the tuned hammer (i.e., the time between pulses 125, 128) is a few seconds. The first counting circuit 141 is adjusted to count the number of output signals from clock 140 which occur within those few seconds. When each count sequence ends, such a period of time has elapsed, and an output signal from counter 141 appears at the lower input of AND gate 142, to enable it to operate. If the line 150 is also marked at this time, responsive to a signal picked up by the geophone 102, the AND gate 142 conducts and provides an output signal to the signal validation circuit 147.

Also, the counter 141 triggers the transmission of a pulse over wire 151 to start counter 143, which thereafter counts clock pulses received over the wire 152, until it has measured a period of time equal to the time period 127.

Hence, after each count is completed by the circuit 141, the counter 143 counts a predetermined number of clock pulses corresponding to the time interval 127. Then, it sends an enable pulse to the lower input of the AND gate 144. If the horizontal geophone 103 is then detecting a sonic energy pulse, the wire 153 is then marked. The AND gate 144 conducts and sends an output signal to the validation circuit 147.

It should now be apparent that the signal validation circuit 147 receives the stream of gate pulses (FIG. 7B) from the AND gate 142, and the stream of gate pulses (FIG. 7D) from the AND gate 144, each pulse in the first stream being separated from a corresponding pulse in the other stream by a time period 127. Accordingly, the validation circuit 147 recognizes each two such successive pulses (one pulse from each stream) as an apparently valid signal indicating receipt of sonic energy sent from the tuned hammer 100. Responsive to each apparently valid pair of pulses, a signal is sent from validation circuit 147 to the accumulator circuit 148, which may be a simple counter. After a sufficient number of apparently valid signals have been counted, the valve 15 is signalled to open or to remain open.

As long as the hammer signals continue to arrive, the accumulator 148 signals the valve 15 to remain open. However, when the hammer signals are no longer received, the accumulator 148 does not signal the valve 15, and its internal spring bias snaps it shut.

With any embodiment of the invention, a motor control switch 80 may also be provided for driving a motor 81 to close a valve via a gear train 82. Limit switches 83 are built into the system so that it knows whether the valve is opened or closed. This conserves the power of batteries in a power source 84, at the bottom of the well. A suitable low power signal may close the valve whenever the power supply 84 approaches exhaustion.

A moment's reflection will reveal many of the advantages of the invention. There is immunity from noise, and no dependence upon extra ducts or transmission lines extending down the well. The transmission line is the walls of the tubing which carries the oil or gas. Thus, the valve control signal transmission line is as reliable as the pipe which carries the oil or gas. If any disaster should sever communications down into the well, the valve closes.

Those who are skilled in the art will readily perceive other modifications. Therefore, the appended claims are to be construed to cover all equivalent structures which fall within the true scope and spirit of the invention.

I claim:

1. A system for communicating into an oil or gas well comprising a gas or oil tubing extending down into said well to a disaster valve near the bottom of the tubing, means near the top of said tubing for selectively transmitting cyclically recurring sonic energy signals through the walls of said tubing when a control function is desired, said signals resolving themselves into vertical and time displaced horizontal sonic energy signals, means near the bottom end of said tubing for detecting and comparing the recurring vertical signals with the time displaced horizontal signals transmitted through said walls, and means responsive to said detection and comparison of said signals for selectively performing said control function upon said disaster valve.

2. The system of claim 1 wherein said transmitting means comprises at least one hydraulic ram attached to the top of said tubing for periodically stretching and relaxing said tubing.

3. The system of claim 1 wherein said transmitting means comprises a tuned hammer for distinctively activating the walls of said tubing with sonic energy.

4. A system for communicating into an oil or gas well comprising a gas or oil tubing extending down into said well to a disaster valve near the bottom of the tubing, sound transmitting means comprising a tuned hammer for distinctively activating the walls of said tubing with sonic energy, said tuned hammer being near the top of said tubing for transmitting cyclically recurring sonic energy signals through the walls of said tubing, said signals resolving themselves into vertical and time displaced horizontal sonic energy signals, means near the bottom end of said tubing for detecting the recurring vertical and the time displaced horizontal signals transmitted through said walls, means for comparing said vertical and horizontal signals of said detected sonic energy transmitted through said tubing wall for detecting the energy of said tuned hammer and discriminating against noise, and means responsive to said detection and discrimination of said sonic energy signals for performing a control function upon said disaster valve.

5. The system of claim 4 and means comprising a source of cyclically recurring clock pulses, means for counting the recurring clock pulses, means responsive to said counting means reaching a predetermined pulse count for generating a gate enable pulse, and means responsive to an appearance of a sonic energy signal simultaneously with said enable pulse for causing said gate to conduct.

6. The system of claim 4 and a source of cyclically recurring clock pulses, first means and second means for repeatedly counting said recurring clock pulses and then enabling one input of an individually associated two input AND gate at the end of each count, means responsive to the reception of each vertical sonic energy signal for applying a signal to the other input of one of said AND gates and for simultaneously starting said second means for counting said recurring clock pulses, means responsive to the pulse count of said second means reaching a predetermined count for applying a signal to one input of a second of said AND gates, means responsive to the reception of each horizontal sonic energy signal for applying a signal to the second input of said second AND gate, and means for indicating an apparently valid signal if the outputs of the two AND gates coincide with said time displacement.

7. The system of claim 6 and means for accumulating a succession of said apparently valid indications for performing said control function upon said disaster valve.

8. The system of claim 7 and means for normally causing said disaster valve means to move to a closed position, and said control function performing means comprising means responsive to said signals transmitted through said walls for moving said valve off normal to an open position, whereby said valve returns to normal and closes when said signals stop.

9. A process for communicating from one end and through the wall of a gas or oil well tubing to a device located at a point remote from said one end, said process comprising the steps of:
   a. periodically transmitting through the walls of said tubing cyclically recurring sonic energy signals from said one end, said signals naturally resolving themselves into time displaced component signals as they travel through said wall,
   b. selectively making said transmission in order to command a control function to occur at said remote device,
   b. detecting the recurring signals at said remote location,
   d. comparing the time displacement of said signal components as they are detected in order to find apparently valid signals, and
   e. performing the commanded control function at said device responsive to said comparing means finding the time displacement between said signal components which naturally occurs as said signals travel through said wall.

10. A process for communicating from one end and through the wall of a gas or oil well tubing to a device located at a point remote from said one end, said process comprising the steps of:
    a. periodically transmitting through the walls of said tubing cyclically recurring sonic energy signals from said one end, said signals naturally resolving themselves into time displaced component signals as they travel through said wall,
    b. detecting the recurring signals at said remote location,
    c. comparing the time displacement of said signal components as they are detected in order to find apparently valid signals,
    d. performing a control function upon said device responsive to said comparing means finding the time displacement between said signal components which naturally occurs as said signals travel through said wall,
wherein said signal components are vertical and horizontal signals, and the steps of:
    e. accumulating the apparently valid signals of said comparing means to discriminate against noise, and
    f. performing said control function responsive to said accumulating means finding a predetermined number of successively apparently valid signals.

11. The system of claim 10 wherein step (d) comprises the added steps of:
    d1. generating periodic cyclically recurring clock pulses,
    d2. counting the recurring clock pulses,
    d3. generating a gate enable pulse responsive to said counting means reaching a predetermined clock pulse count, and
    d4. signalling an occurrence of said apparently valid signal responsive to an appearance of a sonic energy signal simultaneously with said enable pulse for causing said gate to conduct.

* * * * *